United States Patent
Kurennykh et al.

(10) Patent No.: US 11,315,113 B1
(45) Date of Patent: Apr. 26, 2022

(54) SYSTEMS AND METHODS FOR AUTHORIZING A TRANSACTION CONVENTIONALLY INCOMPATIBLE WITH A TECHNICAL PROTOCOL

(71) Applicant: Tangem AG, Zug (CH)

(72) Inventors: Andrey Kurennykh, Zug (CH); Oleksiy Kurbatov, Graz-Andritz (AT)

(73) Assignee: Tangem AG, Zug (CH)

( * ) Notice: Subject to any disclaimer, the term of this patent is extended or adjusted under 35 U.S.C. 154(b) by 0 days.

(21) Appl. No.: 17/520,896

(22) Filed: Nov. 8, 2021

(51) Int. Cl.
| | | |
|---|---|---|
| *G06Q 20/00* | (2012.01) | |
| *G06Q 20/40* | (2012.01) | |
| *G06Q 20/38* | (2012.01) | |
| *H04L 9/32* | (2006.01) | |
| *H04L 9/08* | (2006.01) | |

(52) U.S. Cl.
CPC ......... *G06Q 20/40* (2013.01); *G06Q 20/3821* (2013.01); *G06Q 20/3829* (2013.01); *H04L 9/0816* (2013.01); *H04L 9/32* (2013.01)

(58) Field of Classification Search
CPC ............... G06Q 20/40; G06Q 20/3821; G06Q 20/3829; H04L 9/0816; H04L 9/32
USPC .......................................................... 705/58
See application file for complete search history.

(56) References Cited

U.S. PATENT DOCUMENTS

2021/0127273 A1* 4/2021 Ouzieli ............... H04W 12/106

* cited by examiner

*Primary Examiner* — Dante Ravetti
(74) *Attorney, Agent, or Firm* — Arent Fox LLP; Michael Fainberg

(57) ABSTRACT

Disclosed herein are systems and method for transaction authorization. In one aspect, a method comprises receiving, at an authenticating device from a terminal device, a request to generate a dataset, the request comprising a plurality of data object values indicative of transaction information. The method comprises generating, based on the plurality of data object values, a transaction comprising a source identifier, a destination identifier, a transaction value, and authorization data in a form of a digital signature. The method comprises encapsulating and embedding either the at least one portion of the transaction or the symmetric encryption key in the discretionary data fields and transmitting the dataset to the terminal device that forwards the transaction to a processing service configured to reconstruct the transaction from the forwarded dataset and process the transaction in a target ledger.

20 Claims, 9 Drawing Sheets

SYSTEMS AND METHODS FOR AUTHORIZING A TRANSACTION CONVENTIONALLY INCOMPATIBLE WITH A TECHNICAL PROTOCOL

FIELD OF TECHNOLOGY

The present disclosure relates to the field of distributed ledger technology, and, more specifically, to systems and methods for transaction authorization.

BACKGROUND

The conventional infrastructure of transactional devices utilizes technical protocols such as the Europay, MasterCard, and Visa (EMV) standard. When a point-of-sale (POS) terminal device comes in contact with a smart payment card, the technical protocol is used to carry out the transaction. This involves receiving a transaction authorization and communicating with an acquiring entity, an issuing entity, and a processing service. Unfortunately, technical protocols such as the EMV standard, in their default state, are unable to carry out transactions involving a distributed ledger such as a blockchain. This may be because the discretionary data fields (e.g., tags) used in the technical protocol may not be dedicated to distributed ledger technology (DLT) information or may there may be a size issue that prevents compatibility. For example, a full transaction in Ethereum blockchain has a size of at least 110 bytes including a 64-byte signature. Neither the transaction nor the signature can fit into 32 bytes of unused space in EMV tags.

Thus, if a user were to use a smart payment card to transfer assets in a distributed ledger through a POS terminal, the POS terminal would either not recognize the transaction or generate an error message (e.g., "Retry," "Invalid Input," "Payment Unsuccessful," etc.). Because technical protocols such as the EMV standard are well established in the transaction world, one cannot simply introduce a new technical protocol altogether as doing so would take a significant amount of time to get established. Thus, there is a need to enhance the technical protocol without changing its foundation. The enhancement should properly enable distributed ledger transactions and prevent error messages on POS terminals.

SUMMARY

To address the shortcomings of the conventional infrastructure, aspects of the disclosure describe methods and systems for transaction authorization.

In one exemplary aspect, the techniques described herein relate to a method for transaction authorization, the method including: receiving, at an authenticating device from a terminal device, a request to generate a dataset transmittable through an underlying network compatible with a technical protocol, wherein the request includes a plurality of data object values indicative of transaction information, and wherein credentials to authorize a transaction are stored on the authenticating device; generating, based on the plurality of data object values, a transaction including a source identifier, a destination identifier, a transaction value, and authorization data in a form of a digital signature; determining whether to encapsulate at least one portion of the transaction or a symmetric encryption key allowing to decrypt the digital signature based on a total amount of data that can be allocated and transmitted in discretionary data fields of the dataset of the technical protocol; encapsulating and embedding, based on the determination, either the at least one portion of the transaction or the symmetric encryption key in the discretionary data fields; transmitting the dataset to the terminal device that forwards, using the technical protocol, the transaction to a processing service configured to reconstruct the transaction from the forwarded dataset and process the transaction in a target ledger.

In some aspects, the techniques described herein relate to a method, wherein the authenticating device is one of: (1) a card including an embedded integrated circuit with memory and a microcontroller, and (2) a wearable device configured to communicate with the terminal device.

In some aspects, the techniques described herein relate to a method, wherein determining whether to encapsulate the at least one portion of the transaction or the symmetric encryption key is further based on a size of the transaction and a length of the digital signature in the transaction.

In some aspects, the techniques described herein relate to a method, wherein the transaction is a blockchain transaction indicative of transferring one or more blockchain assets equivalent to the transaction value from the authenticating device to an address included in the destination identifier, and wherein the terminal device generates an alert indicating whether the transaction is authorized.

In some aspects, the techniques described herein relate to a method, wherein the transaction is a blockchain transaction and wherein the technical protocol is not compatible with the blockchain transaction.

In some aspects, the techniques described herein relate to a method, wherein the terminal device forwards the transaction to the processing service via a network operator associated with the authenticating device and an issuing entity that processes the transaction.

In some aspects, the techniques described herein relate to a method, further including: in response to determining that the at least one portion of the transaction is to be encapsulated, splitting the digital signature of the transaction by: generating a randomized value; calculating, using an elliptic curve digital signature algorithm (ECDSA), a first portion of the digital signature based on the randomized value, wherein values in the first portion are independent from the transaction; transmitting the portion to the processing service using a user device connected to the authenticating device; calculating, using the ECDSA, a second portion of the digital signature based on the randomized value and the transaction; including the second portion of the digital signature in the transaction.

In some aspects, the techniques described herein relate to a method, further including: in response to determining that the symmetric encryption key is to be encapsulated, generating an array of signatures; generating an array of randomized symmetric encryption keys, wherein each randomized symmetric encryption key corresponds to a signature; generating a respective token for each pair of blockchain signature and randomized symmetric encryption key, wherein the respective token is the blockchain signature encrypted with the randomized symmetric encryption key in each pair; transmitting the respective tokens to the processing service using a user device connected to the authenticating device; including a given encrypted randomized symmetric encryption key and an index of the given encrypted randomized symmetric encryption key in the transaction, wherein the processing service is configured to decrypt the blockchain signature from the respective token using the respective index, and the encrypted randomized symmetric encryption key.

In some aspects, the techniques described herein relate to a method, wherein receiving, at the authenticating device, the request to generate the dataset is in response to the authenticating device coming in contact with the terminal device.

In some aspects, the techniques described herein relate to a method, wherein receiving, at the authenticating device, the request to generate the dataset is in response to the authenticating device establishing a connection with the terminal device.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for transaction authorization. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure describes transaction authorization in payment systems requiring direct consent for operations from the holder of funds (e.g., blockchains, central bank digital currencies (CBDCs), distributed ledger technologies (DLTs)). Such an authorization may be generated using a personal cryptographic key management device (e.g., a hardware wallet, self-custody, self-storage, etc.) built into a smartcard or a wearable-based payment device (e.g., a smartwatch), and relayed to the target payment system via payment systems and infrastructures compatible with a pre-existing technical protocol—without the modification of the systems and infrastructures. The smartcard may transmit the authorization using a standard single-tap contactless approach or an insert-your-card contact approach made with a chip and PIN bank card.

Using the systems and methods described in the present disclosure, a bank payment card may, for example, serve as a personal hardware wallet for blockchain assets and, simultaneously, enable payment at a POS terminal with the stored assets. The entire existing payment infrastructure, including bank cards, POS terminals, POS (acquirer) processing, card (issuer) processing, may comply with a technical protocol such as the EMV standard, which defines the format of transactions and communication protocols. Accordingly, the systems and methods describe encapsulating at least a portion of a DLT transaction (e.g., a blockchain transaction) into a standard EMV transaction. This way, the blockchain transaction can be transmitted through existing payment network to the blockchain. No modifications are done to the POS terminal, to the POS (acquirer) processing systems, or to the core payment network. In other words, the payment process between the customer and the merchant is not changed and no error messages are returned by the POS terminal. A processing service back-end is an inherent part of the present disclosure. It is integrated both with an issuing bank's card processing service and the target payment system, and provides security and integrity.

Figure 1:
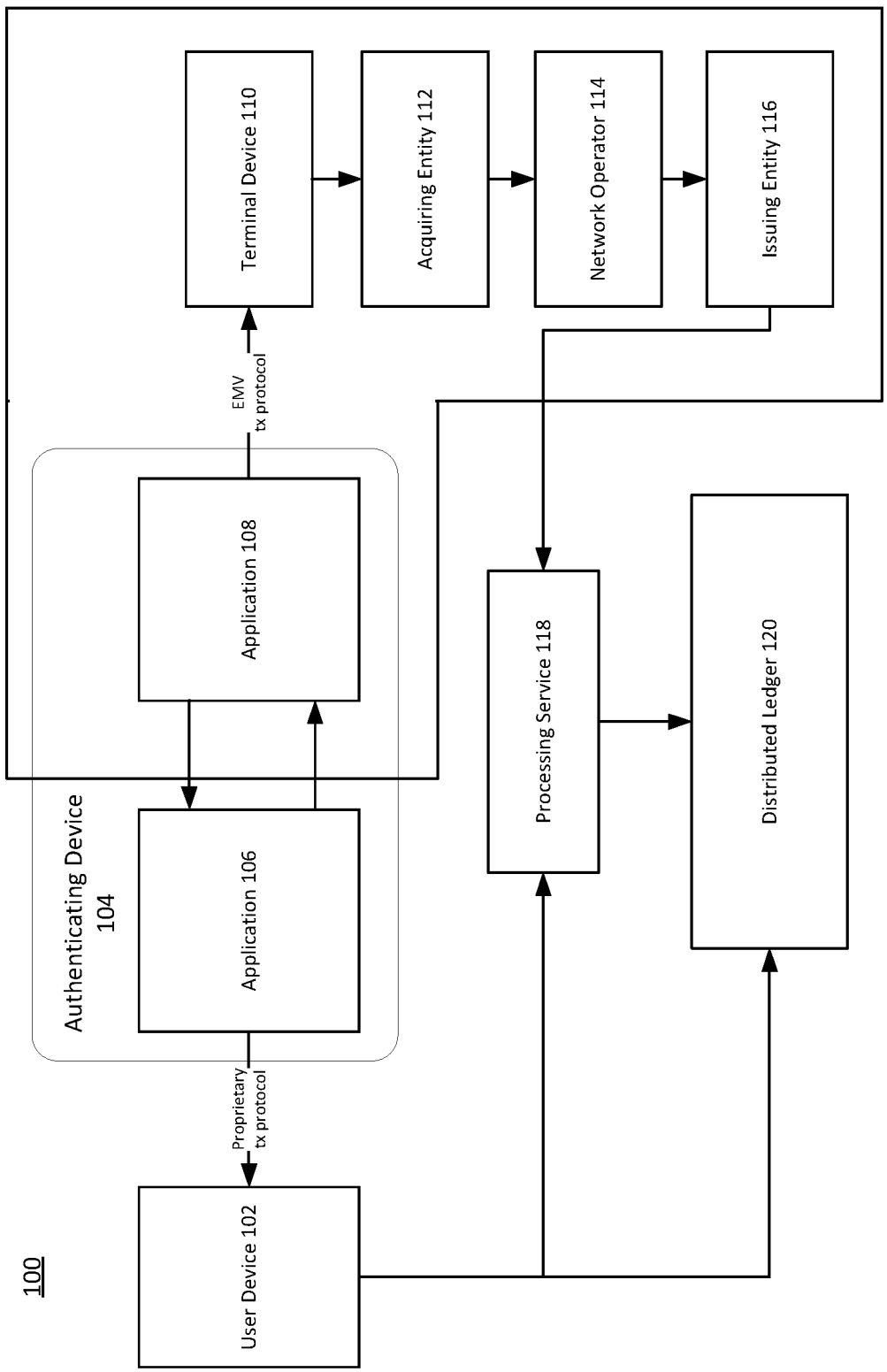
FIG. 1 is a block diagram illustrating a system for transaction authorization.

FIG. 1 is block diagram 100 illustrating a system for transaction authorization. In diagram 100, user device 102 may be any computing device (e.g., smartphone, tablet, etc.) that can wirelessly connect with authenticating device 104, which may be a smart card or a wearable device (e.g., smartwatch). Utilizing the systems and methods described in the present disclosure, authenticating device 104 may serve as a personal hardware wallet capable to transact both in a traditional payment network (e.g., the Visa network) and in modern peer-to-peer networks (e.g., blockchains, CBDC ledgers, etc.) without requiring a POS upgrade. More specifically, authenticating device 104 cryptographically secures ownership of digital assets and may comprise a contactless interface (e.g., NFC) that enables interaction with user device 102 to directly authorize digital currency transactions in distributed ledger 120 (e.g., a central ledger, a blockchain, etc.)

In one aspect, authenticating device 104 may be a smart card that includes a secure smart-card chip having an ISO/IEC 14443 contactless interface. A smart card is a thin electronic device that is able to perform computing functions. For example, the smart card may be in the form of a thin piece of paper, metal, plastic or cardboard. The size of the card may vary, but is preferably smaller than or equal to the size of a hand of an average person. Within the body of authenticating device 104 may be one or more electronic components which include, but are not limited to, a processor, memory, and at least one interface that allows communication with other devices such as terminal device 110 and user device 102. Authenticating device 104 may also include an internal power source, e.g., battery, that provides power to the electronic components. Such internal power source may be recharged via electromagnetic waves, e.g., radio waves. In some aspects, authenticating device 104 may not have any internal power source, but may activate or function via electromagnetic waves, e.g., radio waves. In other words, electromagnetic waves may both provide a power source and a means of communication for authenticating device 104.

Authenticating device 104 may include a card operating system (OS) that implements operations with a distributed ledger (e.g., blockchain) wallet. In some aspects, the binary code of the card OS is constant and not capable of being remotely updated or managed. The card OS may execute application 106 and application 108. Application 106 may be a wallet application and application 108 may be a payment system application.

In the beginning of a life cycle of authenticating device 104, upon the card OS being loaded onto authenticating device 104, authenticating device 104's status is set to "New." Authenticating device 104 may be configured to only accept a personalization command at this time. Additionally, authenticating device 104 may be configured such that this command may be executed only once in defining the principal parameters of authenticating device 104. Upon executing a personalization command, the principal parameters are read-only and authenticating device 104's status is set to "Empty," rendering authenticating device 104 ready for operation by an end user and including all relevant data except for the distributed ledger (e.g., blockchain) wallet keys.

Application 106 may then generate a wallet key pair by executing a "Create Wallet" command. This command results in authenticating device 104's status changing to "Loaded," and returns a public key of the wallet to the user. At this time, a user may utilize any third party blockchain wallet application to fund the associated wallet with the relevant cryptocurrency. In one embodiment of the present invention, application 106 does not monitor incoming transactions and wallet balance.

In some aspects, application 106 may provide optional mechanisms for storing wallet balance on authenticating device 104 and enabling offline wallet balance verification. On-card wallet balance storage and offline wallet balance verification may be performed through a dedicated card memory block that securely stores and updates balance information signed by the card issuer. In the "Loaded" status, application 106 supports a plurality of commands, including a "Sign" command, which is configured such that application 106 generates and returns a transaction signature. Additional commands are discussed in later portions of the present disclosure.

The card OS may additionally implement operations with a communication protocol on top of the ISO/IEC 14443 standard to interact with a contactless terminal device 110 or user device 102. For example, authenticating device 104 may include a short-range communication module that communicates with terminal device 110 via a short-range communication range. The short-range communication range is typically shorter than a wireless communication range of terminal device 110. In an exemplary embodiment, the short-range communication range may include, but is not limited to, near-field communication (NFC), Bluetooth, etc. In another exemplary embodiment, a wireless communication range may include, but is not limited to, Wi-Fi or a mobile network, e.g., 2G, 3G, 4G, 5G, LTE, etc. Thus, even though authenticating device 104 may be in the wireless communication range of terminal device 110, the short-range communication module may not commence short-range communication with terminal device 110 until terminal device 110 is within the short-range communication range of authenticating device 104. Authenticating device 104 may communicate with user device 102 using a proprietary transmission protocol and may communicate with terminal device 110 using a technical transmission protocol (e.g., EMV transmission protocol).

User device 102 may be, for example, an NFC-capable smartphone. User device 102 may provide a user interface (UI) and permit interaction with authenticating device 104 via an iOS- or Android-based application and NFC interface. Consider a blockchain-based implementation. In some aspects, user device 102 may perform several functions, including but not limited to obtaining a public key associated with the blockchain wallet of authenticating device 104, verifying that authenticating device 104 comprises the appropriate private key (such as through a challenge-response mechanism), obtaining a blockchain wallet balance via external blockchain nodes, and attesting authenticating device 104. User device 102 may utilize a mobile application, such as an iOS- or Android-based application, that performs the aforementioned functions and the like.

Terminal device 110 may be a POS terminal, which is a hardware system for processing payments at retail locations. For example, terminal device 110 may include software configured to read magnetic strips of smart cards or communicate with a wearable device (e.g., a smartwatch) capable of executing financial transactions. Examples of terminal device 110 include, but are not limited to, a tablet, a computer, a kiosk, a card reader, or merchant-specific payment hardware.

Henceforth the technical protocol discussed in the present disclosure is the EMV technical standard. It should be noted, however, that as technical protocols upgrade or are replaced, the methods and systems described herein are still applicable so long as the technical protocol does not natively support transacting with peer-to-peer networks such as blockchains. Thus, the EMV standard is merely an example. Even in the case of the EMV standard, EMV is an extensible and evolving standard with many implementations (Visa, MasterCard, etc.). In the future or in some particular implementations of payment systems, different tags can be used to transmit blockchain-related payload regardless of the version of the technical protocol.

In a general overview of diagram 100, terminal device 110 may initiate communication with authentication device 104 by requesting transaction authorization (e.g., for an item or service purchased by a user from a merchant). Authenticating device 104 may provide the transaction authorization to terminal device 110 using the EMV transmission protocol. Terminal device 110 may then transmit a settled transaction to acquiring entity 112, which may be a bank representing the merchant (e.g., maintains a merchant's bank account, processes payments, and enables merchants to accept payments through card networks). Acquiring entity 112 identifies an appropriate network operator 114 to submit the transaction to. Network operator 114 may be a payment processor (e.g., a card association) that communicates the transaction details with issuing entity 116, which may be a bank representing the user (e.g., the customer). Conventionally, issuing entity 116 debits the user's bank account and submits the payment to network operator 114, which forwards the payment to acquiring entity 112 to settle the transaction. In diagram 100, issuing entity 116 may forward the transaction to processing service 118, which manages digital (crypto) transaction processing and provides integration with computing nodes maintaining distributed ledger 120. Henceforth, processing service 118 will be considered a blockchain processing service and distributed ledger 120 will be considered a blockchain. It should be noted that this is merely part of an overarching example. In fact, in the context of the present disclosure, all payment systems are considered based on asymmetric cryptography digital signature schemes. These might be centralized (e.g., CBDC) or distributed ledgers, the latter including public (e.g., Ethereum) or private blockchains.

Figure 2:
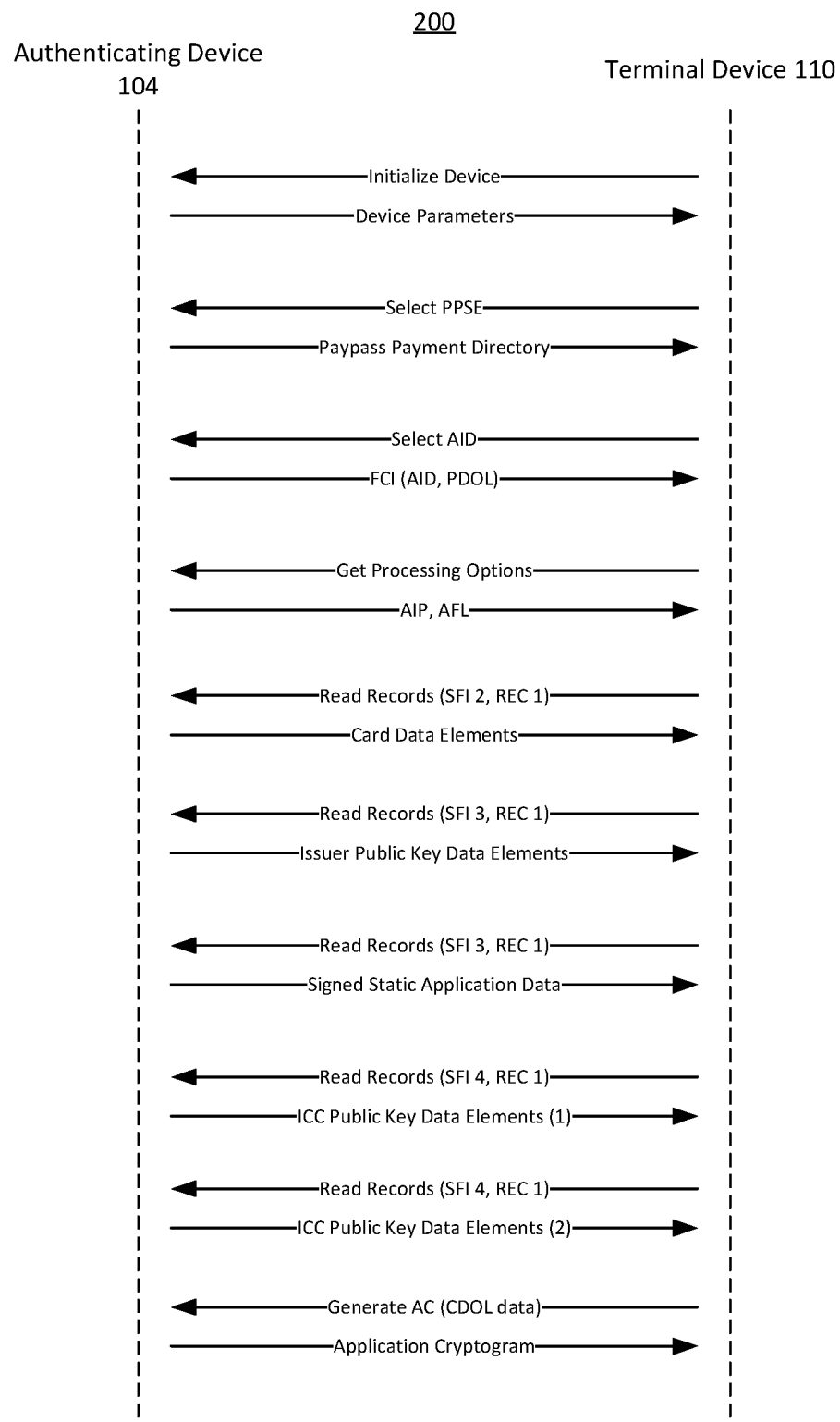
FIG. 2 is a block diagram illustrating transaction processing.

FIG. 2 is block diagram 200 illustrating communication between an authenticating device and a terminal device. The technical protocol in diagram 200 is the EMV standard. The communication is described briefly below because it involves normal EMV-based communication. For example, terminal device 110 initializes authenticating device 104, and in response receives device parameters. In the case of a contactless card structure, terminal device 110 sends a Select Proximity Payment System Environment (PPSE) command and receives a paypass payment directory. Terminal device 110 then sends a Selects Application Identifier (AID) command, which queries the type of card and which company (e.g., Visa, Amex, etc.) the card is assigned to. Authenticating device 104 may provide, to terminal device 110, file control information (FCI) with details about the selected application (e.g., name of application, application priority indicator, etc.) and a processing options data object list (PDOL) that includes details or tags required to do further processing of the transaction. Terminal device 110 responds with a Get Processing Options command. Authenticating device 104 responds with an application interchange profile (AIP), which shows which applications are supported by authenticating device 104, and an application file locator (AFL), which lists all files that are required for the transaction. Terminal device 110 subsequently sends multiple Read Record commands and receives, from authenticating device 104, card data elements, issuer public key data elements, signed static application data, etc., respectively. Lastly, terminal device 110 sends a command to generate an application cryptogram (AC) and provides a card risk management data object list (CDOL), which includes data elements needed to generate the AC. Subsequent to generating the AC, authenticating device 104 transmits the AC to terminal device 110.

According to EMV standards, sub-fields (Application Cryptogram, 8 bytes) and (Issuer Application Data, last 24 bytes of total 32 bytes) are delivered to the issuer's processing service unchanged, and transactions cannot be filtered out by acquirers or payment networks on the basis of these fields. The present disclosure describes using, for example, these total 32 bytes to embed data related to blockchain transactions. In general, for any technical protocol, the present disclosure describes embedding data related to distributed ledger transactions in discretionary data fields that are delivered to an issuing entity's processing service unchanged.

In the overarching example, authenticating device 104 may receive from terminal device 110, a Get Processing Options or Generate AC command (including a CDOL1 data structure). A blockchain transaction may include six fields: (1) address of the source wallet, (2) address of the destination wallet, (3) amount of transactions, (4) unique transaction nonce, (5) transaction fee, (6) digital signature of the transaction (a cryptographic function of the first five fields). It should be mentioned that the disclosed method is also relevant for UTXO-blockchains (e.g., Bitcoin) that use transaction inputs and outputs instead of wallet addresses. Authenticating device 104 may construct such the transaction based on information in the received CDOL1 data and data stored on the card (e.g., address of source [i.e. device's own] wallet, address of destination wallet [i.e. the one controlled by processing service 118], currency rate, nonce, etc.). Authenticating device 104 then signs the transaction. In some aspects, depending on the total amount of dat that can be allocated and transmitted in unused EMV tags, the size of the serialized transaction (in bytes) and the length of the cryptographic signature of the transaction (in bytes), authenticating device 104 encapsulates one of the following into unused EMV tags: (1) the entire transaction or the signature, (2) part of the transaction and the whole signature, (3) part of the transaction, part of the signature given that these parts allow to reconstruct the whole signature in processing service 118, and (4) a symmetric encryption key allowing to decrypt previously generated transaction signatures. Authenticating device 104 thus responds to terminal device 110 with a properly formatted EMV transaction having transaction data inside.

For example, authenticating device 104 may receive a Get Processing Options or Generate AC command from terminal device 110 comprising:
(Tag)(Length)
9F02 06—Authorized amount of the transaction (excluding adjustments)
9F1A 02—the country of the terminal
95 05—Status of the different functions as seen from the terminal
5F2A 02—the currency code of the transaction
9A 03—Local date that the transaction was authorized
9C 01—the type of financial transaction
9F37 04—Value to provide variability and uniqueness to the generation of a cryptogram and may respond with message data field wrapped in tag 77 that consists of several data objects:
77 xx
[Cryptogram Information Data] 9F27 01 80
[Application Transaction Counter] 9F36 02 001B
[Application Cryptogram] 9F26 08 B31B2D16 69860BD5
[Issuer Application Data] 9F10 yy . . .
9000 [SW: success]
Alternatively, authenticating device 104 may respond with message data field wrapped in tag 80. In that case, the value is a concatenated list of implicit data objects (tag+length fields are not present):
80 xx
[9F27 01 (Cryptogram Information Data)]: 80
[9F36 02 (Application Transaction Counter)]: 001B
[9F26 08 (Application Cryptogram)]: 9F26 08 B31B2D16 69860BD5
[9F10 yy (Issuer Application Data)]: . . . 9000
[SW: success]

Figure 3:
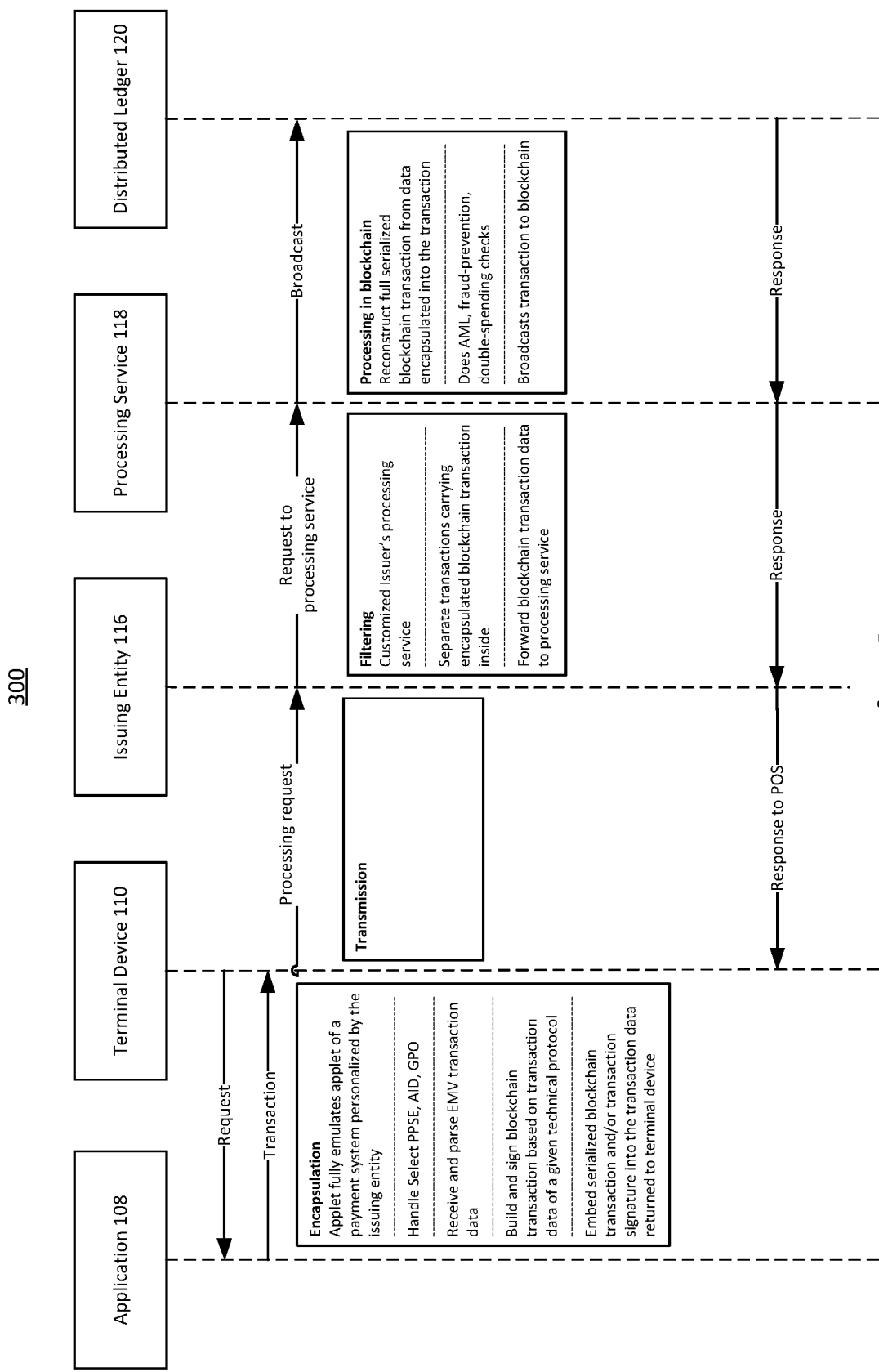
FIG. 3 is a block diagram illustrating communication between an authenticating device and a terminal device.

FIG. 3 is block diagram 300 illustrating transaction processing using encapsulation. Diagram 300 specifically describes the process subsequent to terminal device 110 receiving the EMV transaction having information about the blockchain transaction inside. Application 108 of authenticating device 104 may fully emulate the applet of a conventional payment system personalized by issuing entity 116. Application 108 handles Select PPSE and AID, and Get Processing Options commands, as well as receives and parses EMV transaction data. Application 108 builds and signs blockchain transactions based on transaction data of a given technical protocol (e.g., the EMV standard). Moreover, application 108 embeds serialized blockchain transaction and/or transaction signature into the transaction data returned to terminal device 110. The constructed transaction is deemed canonical by terminal device kernel and acquiring entity 112, and seamlessly propagated by a payment system to issuing entity 116 for processing. Issuing entity 116 performs filtering by separating transactions carrying encapsulated blockchain transaction data inside from typical transactions and forwards the blockchain transaction data to processing service 118. Processing service 118 reconstructs the full serialized blockchain transaction from data encapsulated into the EMV transaction, does fraud prevention checks, double-spending checks, anti-money laundering (ANK) checks, and broadcasts the transaction to distributed ledger 120. Ledger 120 confirms the addition of the transaction and sends a confirmation response back to processing service 118.

Figure 4:
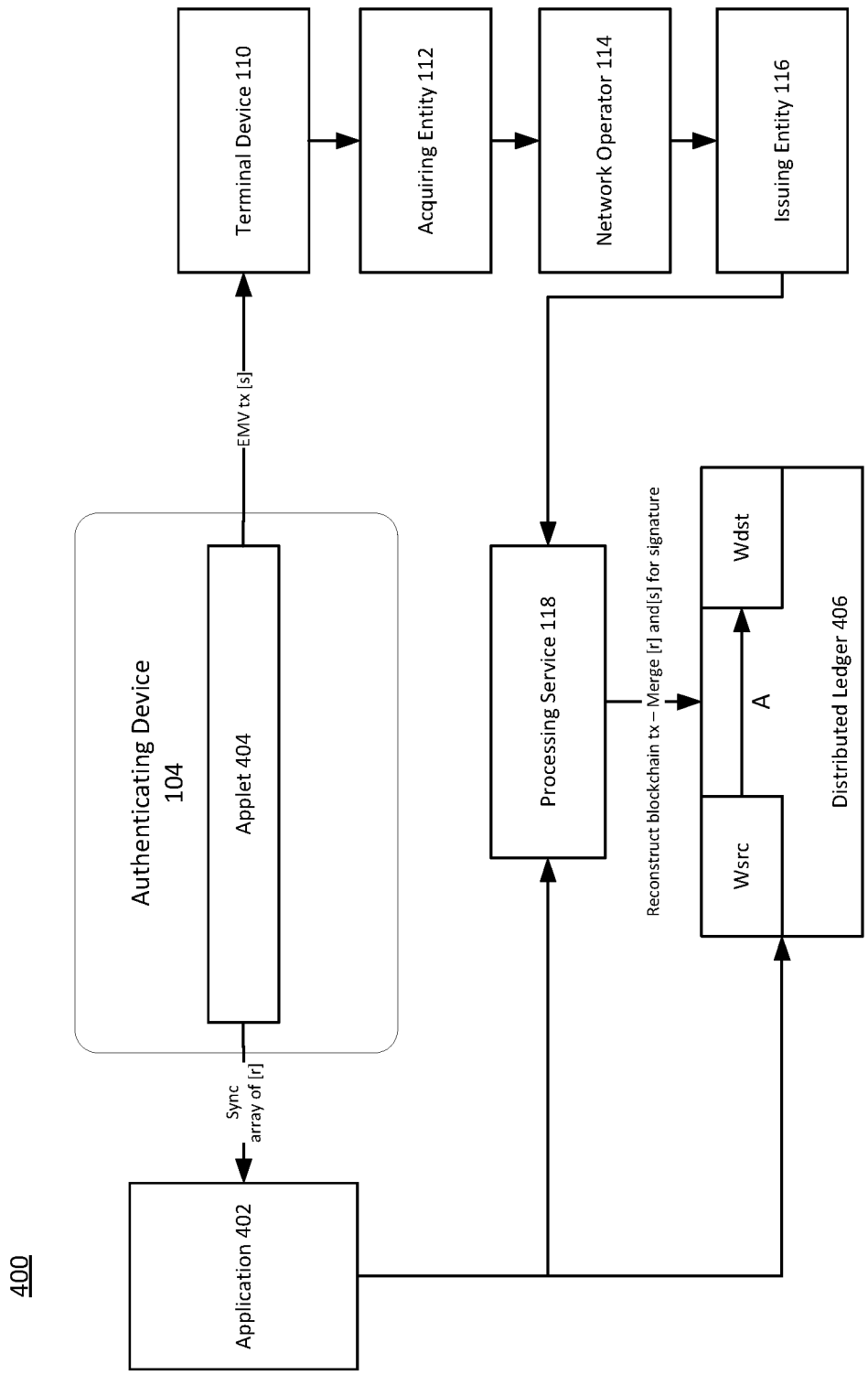
FIG. 4 is a block diagram illustrating encapsulation of a portion of the transaction.

FIG. 4 is block diagram 400 illustrating encapsulation of a portion of the transaction. As mentioned previously, a blockchain transaction may not be supported by a technical protocol such as the EMV standard due to size constraints. For example, a full transaction in Ethereum blockchain has size of at least 110 bytes including a 64-byte signature. Neither the transaction nor the signature can fit into 32 bytes of unused space in EMV tags. Suppose that the signature is an elliptical curve digital signature algorithm (ECDSA) signature. An ECDSA signature can be split into two 32-byte portions [r] and [s]. Part [r] is generated from random [k], r=Fr(k), and does not depend on the transaction being signed. Part [s] is generated from random [k] and a hash of the transaction s=Fs(k, hash(Tx)). Therefore [k] and [r] can be pre-generated, stored on authenticating device 104, and then [r] can be loaded into processing service 118 long before signing the transaction.

There are three stages to consider in the context of diagram 400: personalization, synchronization, and transactional. Starting from the personalization stage, authenticating device 104 personalization may be fulfilled by its manufacturer or an issuer in the beginning of authenticating device 104's life cycle. This involves a source wallet address being generated by a Create Wallet command, and a destination address and any optional blockchain data being loaded to authenticating device 104 by a Write Issuer Data command.

The synchronization stage may be performed periodically by an end user by using application 402 on user device 102 (e.g., an NFC-enabled smartphone) connected to processing service 118. An objective of synchronization is to always have a proper blockchain nonce on authenticating device 104 and to have a stock of pre-generated [r] in processing service 118. Synchronization may be performed at any time—not necessarily before the POS payment. Synchronization involves applet 404 optionally retrieving a starting nonce [n0] from application 402 (e.g., it is required in Ethereum, if the blockchain's nonce is an integer value, incremented for each transaction). Applet 404 generates an array of [k] (32-bytes random number), and stores the array in NVM[A3]. Applet 404 further calculates array of [r]=Fr(k) (32 byte number) which is a portion of the ECDSA signature (r|s). Applet 404 then shares array [r] with application 402, which relays [r] to processing service 118.

When authenticating device 104 connects with terminal device 110 (e.g., when authenticating device 104 is tapped against terminal device 110), a blockchain transaction is generated and signed by applet 404 as described previously in the description of the EMV transaction flow. For that, applet 404 constructs the entire blockchain transaction by merging $T_x=(W_{src}/W_{dst}/A/f/n)$. In this case, $W_{src}$ is a source identifier (e.g., the address of authentication device 104's blockchain wallet (fixed value, generated by card during Create Wallet command)) and $W_{dst}$ is a destination identifier (e.g., address of destination blockchain wallet (fixed value, stored in the card during the personalization stage)). "A" is the transaction amount, which is received from terminal in CDOL1 data (tag 9F02, Amount). "f" is the transaction fee in blockchain (fixed value, stored in the card during the personalization stage). "n" is the blockchain nonce (e.g., an integer value, automatically incremented by applet 404 on completion of each EMV transaction with terminal device 110 and delivered in EMV transaction (tag 9F36, Application Transaction Counter (ATC))). The nonce is optionally updateable during the synchronization stage and alternatively, in some blockchains, the nonce can be generated from the Transaction Date field (tag 9A, 6 numeric digits) and some random data-meaning that the synchronization of nonce is not required in this case.

Applet 404 takes the first available pre-generated [k] and the hash of the generated blockchain transaction and calculates the second part of the signature [s]: $s=F_s(k, T_x)$. Applet 404 then embeds [s] into the EMV transaction and transmits the EMV transaction to processing service 118 through terminal device 110 as described previously.

In some aspects, applet 404 then permanently deletes the used [k] from NVM. Iissuing entity 116 filters out and forwards the EMV transaction to processing service 118 (e.g., using a standard ISO8583 routing).

After [s] is delivered to processing service 118, processing service 118 reconstructs the blockchain transaction by merging $W_{src}$ (known to processing service 118, corresponds to authenticating device 104's primary account number (PAN) delivered in the EMV transaction), $W_{dst}$ (address of destination blockchain wallet, controlled by processing service 118 and used to collect all incoming payments), A (delivered in the EMV transaction (tag 9F02, Amount)), f (fixed value known to both authenticating device 104 and processing service 118), and n (delivered in the EMV transaction (tag 9F36, Application Transaction Counter (ATC))). Processing service 118 further performs optional AML checks and anti-fraud checks, broadcasts the blockchain transaction to distributed ledger 406, and ensures the blockchain transaction cannot be rolled back (e.g., because of double spending). Processing service 118 then responds to issuing entity 116 with the result of the operation (e.g., OK or not OK). If the result of the operation is OK (e.g., the blockchain transaction is approved by the blockchain network and stored on distributed ledger 406, terminal device 110 indicates that the transaction is approved (e.g., on a screen). If the result is not OK, terminal device 110 indicates that the transaction has been declined.

Figure 5:
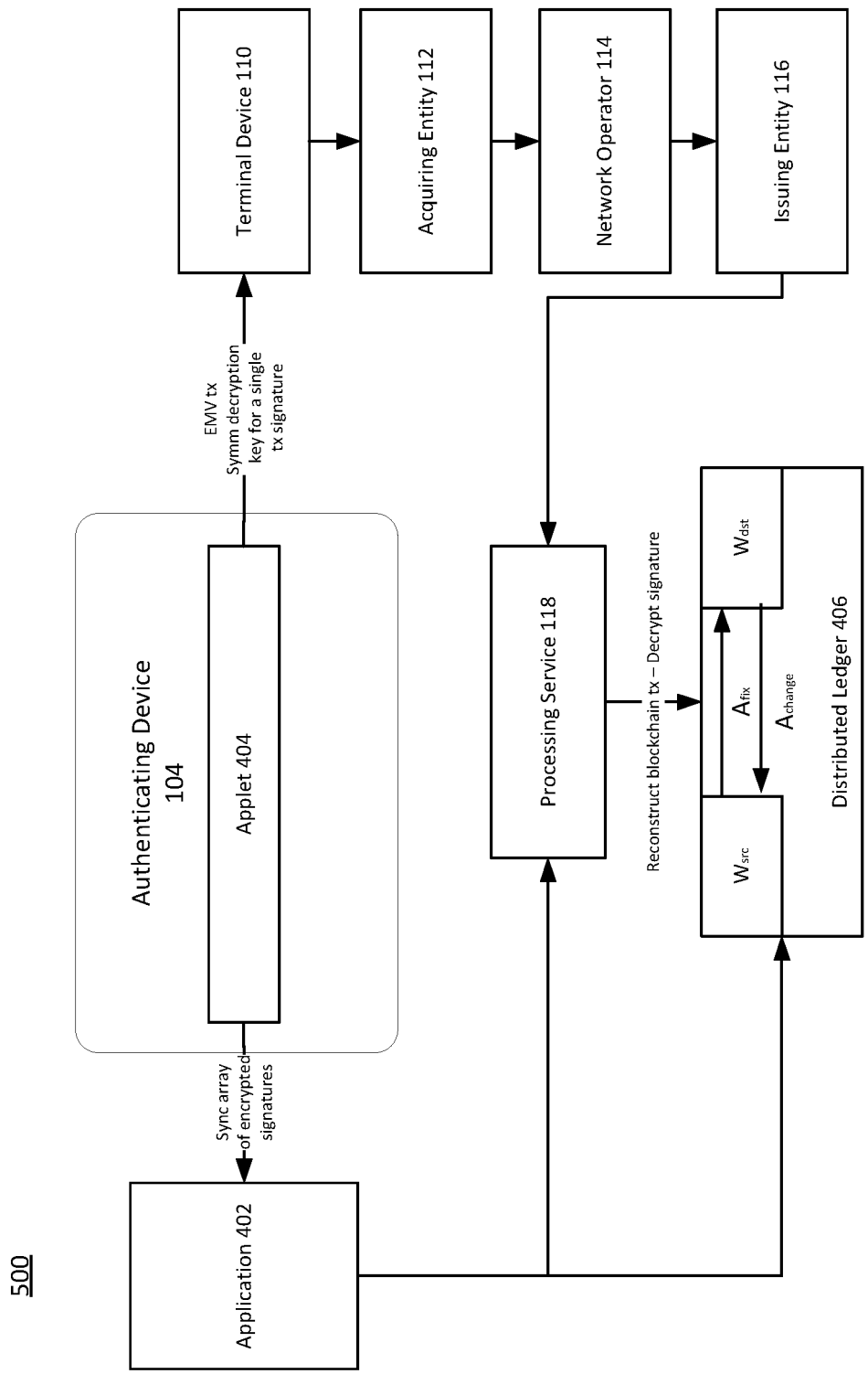
FIG. 5 is a block diagram illustrating encapsulation of a symmetric encryption key.

FIG. 5 is block diagram 500 illustrating encapsulation of a symmetric encryption key. Diagram 500 represents a tokenization scheme that is also divided into three stages: personalization, synchronization, transactional. The main approach here is to use one-off keys packed into EMV tags to decrypt pre-generated blockchain transactions. This method allows to fit blockchain transaction information into 16-18 bytes of EMV space and enables payments in a currency different from the blockchain asset stored in authenticating device 104 (e.g., source wallet can store USDC or ETH, but the POS transaction can be done in Europe and denominated in EUR).

In some cases, network operator 114 or issuing entity 116 may require transmittal of a properly computed Application Cryptogram (ARQC) (tag 9F26, 8 bytes) and may utilize more than the first 8 bytes in Issuer Application Data (IAD) (tag 9F10, 32 bytes in total). In this case, even a part of the ECDSA signature will not fit into an EMV transaction. The proposed workaround allows to pre-generate and sign the blockchain transaction on authenticating device 104 before the real payment happens and the EMV transaction is handled.

During the personalization stage, the source wallet address is generated by card during the Create Wallet command, and a destination address and optional blockchain data are loaded to card by the Write Issuer Data command. The personalization stage involves setting a fixed blockchain fee, and a fixed amount of transaction considered to be safe for single-tap contactless payments (without entering PIN code).

During the synchronization stage, which is also performed periodically, applet 404 generates an array of blockchain transactions $T_x=(W_{src}/W_{dst}/A_{fixed}/f/n)$, where each transaction is constructed by merging $W_{src}$, $W_{dst}$, $A_{fixed}$ (transaction amount: fixed amount defined during personalization, e.g. 50 USDC, or 0.5 ETH), f, and n.

Applet 404 generates an array of blockchain transactions signatures $S=F(T_x)$ and generates array of 16-byte random symmetric encryption keys [K]. Using an encryption scheme such as AES-128, applet 404 encrypts each [K,] with [$K_{card}$] defined during personalization and stores an array of encrypted keys $K_{enc}=AES128(K_{card}, K)$ in NVM.

Applet 404 also uses an encryption scheme such as AES-128 to encrypt each signature [$S_i$] with corresponding [$K_i$] and shares array of 'tokens' $T=AES128(K, S)$ with application 402 on user device 102, which relays the array to processing service 118. When authenticating device 104 is connected to terminal device 110, applet 404 picks the first available [$K_{enc}$] from NVM and embeds it into the EMV transaction by utilizing the last 16 bytes of tag 9F10, Issuer Application Data (IAD). Applet 404 stores the array index of the picked [$K_{enc}$] into EMV tag 9F36, Application Transaction Counter (ATC). Applet 404 then transmits the EMV transaction to processing device 118 through terminal device 110 as described previously. In some aspects, applet 404 deletes used [$K_{enc}$] from NVM after the transaction is received by processing service 118.

After [$K_{enc}$] is delivered to processing service 118, processing service 118 reconstructs the blockchain transaction similar to diagram 400, except that the transaction amount $A_{fixed}$ is fixed and known to processing service 118 and that the signature is decrypted (e.g., using AES128) from token $T_n$ received during synchronization (where n is the array index received in EMV tag 9F36, Application Transaction Counter (ATC), and the key [$K_{enc}$] is taken from last 16 bytes of tag 9F10, Issuer Application Data (IAD), in the EMV transaction.

In some aspects, as previously described, processing service 118 may also perform a few optional actions such as verify funds (AML check), protect against double spending attack in the blockchain, and prevent fraud by checking against some rules. Processing service 118 further broadcasts the transaction to distributed ledger 120. Ledger 120 confirms the addition of the transaction and sends a confirmation response back to processing service 118, which propagates the confirmation to terminal device 110 (e.g., acceptance or denial).

Figure 6:
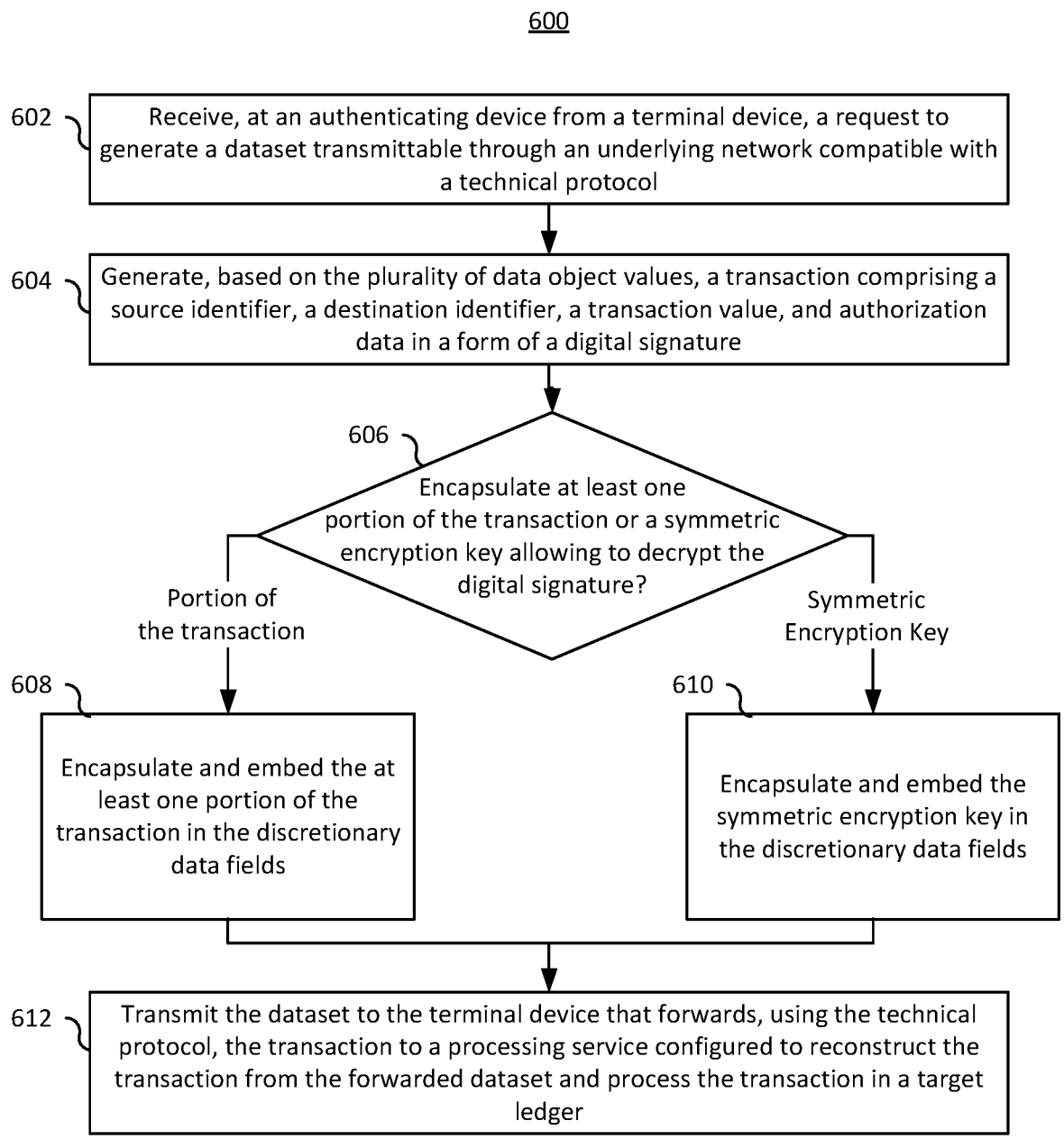
FIG. 6 illustrates a flow diagram of a method for transaction authorization.

FIG. 6 illustrates a flow diagram of method 600 for transaction authorization. At 602, authenticating device 104 receives (e.g., via applet 404), from terminal device 110, a request to generate a dataset transmittable through an underlying network compatible with a technical protocol. As discussed previously, in some aspects, authenticating device 104 is one of a card comprising an embedded integrated circuit with memory and a microcontroller, and a wearable device configured to communicate with the terminal device.

The request may further comprise a plurality of data object values indicative of transaction information, and credentials to authorize a transaction are stored on the authenticating device. For example, the underlying network may comprise acquiring entity 112, network operator 114, and issuing entity 116. The technical protocol may be, for example, the EMV standard. The request to generate a dataset may be a request to generate an application cryptogram. The plurality of data object values may include the values in CDOL1. The credentials to authorize the transaction may be private encryption keys described previously.

In some aspects, receiving, at authenticating device 104, the request to generate the dataset is in response to authenticating device 104 coming in contact with terminal device 110. For example, authenticating device 104 may comprise a chip that is inserted into a chip reader in terminal device 110. In other aspects, receiving the request to generate the dataset is in response to authenticating device 104 establishing a connection with terminal device 110. In some aspects, this connection is wireless (e.g., authenticating device 104 being briefly waved over terminal device 110 in close proximity to enable a wireless connection).

At 604, applet 404 generates, based on the plurality of data object values, a transaction comprising a source identifier (e.g., $W_{src}$), a destination identifier (e.g., $W_{dst}$), a transaction value (e.g., A), and authorization data in a form of a digital signature. This transaction may be, for example, a blockchain transaction that is not transmittable through the technical protocol as it will cause an error and the transaction will not go through. The blockchain transaction is indicative of transferring one or more blockchain assets equivalent to the transaction value from authenticating device 104's wallet to an address comprised in the destination identifier.

At 606, applet 404 determines whether to encapsulate at least one portion of the transaction or a symmetric encryption key allowing to decrypt the digital signature based on a total amount of data that can be allocated and transmitted in discretionary data fields (e.g., EMV tags) of the dataset (e.g., the application cryptogram) of the technical protocol (e.g., the EMV standard). For example, the EMV standard has 32 bytes of unused space in EMV tags. If the at least one portion of the transaction can be encapsulated in 32 bytes of unused space, then applet 404 encapsulated the at least one portion of the transaction. If the symmetric encryption key can be encapsulated in the unused space, but not the at least one portion of the transaction, then the symmetric encryption key is encapsulated instead. Depending on the technical protocol, both options may be available. For example, in the case of the EMV standard, applet 404 may choose either approach to encapsulation successfully. Thus, in some aspects, applet 404 may be preconfigured to select one of the two approaches for a particular technical standard.

In some aspects, determining whether to encapsulate the at least one portion of the transaction or the symmetric encryption key is further based on a size of the transaction and a length of the digital signature in the transaction. For example, as discussed previously, network operator 114 or issuing entity 116 may require transmittal of a properly computed Application Cryptogram (ARQC) (tag 9F26, 8 bytes) and may utilize more than the first 8 bytes in Issuer Application Data (IAD) (tag 9F10, 32 bytes in total). In this case, even a part of the ECDSA signature for a blockchain transaction of certain type (e.g., Ethereum) will not fit into an EMV transaction. In this case, encapsulation of a symmetric encryption key is needed.

In response to determining that the at least one portion of the transaction should be encapsulated, method 600 advances to 608, where authenticating device encapsulates and embeds the at least one portion of the transaction in the discretionary data fields (described in diagram 400). In response to determining that the symmetric encryption key should be encapsulated, method 600 advances to 610, where authenticating device encapsulates and embeds the symmetric encryption key in the discretionary data fields (described in diagram 500). From 608 and 610, method 600 advances to 612, where authenticating device 104 transmits the dataset (e.g., the application cryptogram) to terminal device 110 that forwards, using the technical protocol, the transaction to a processing service (e.g., processing service 118) configured to reconstruct the transaction from the forwarded dataset and process the transaction in a target ledger (e.g., distributed ledger 120).

Figure 7:
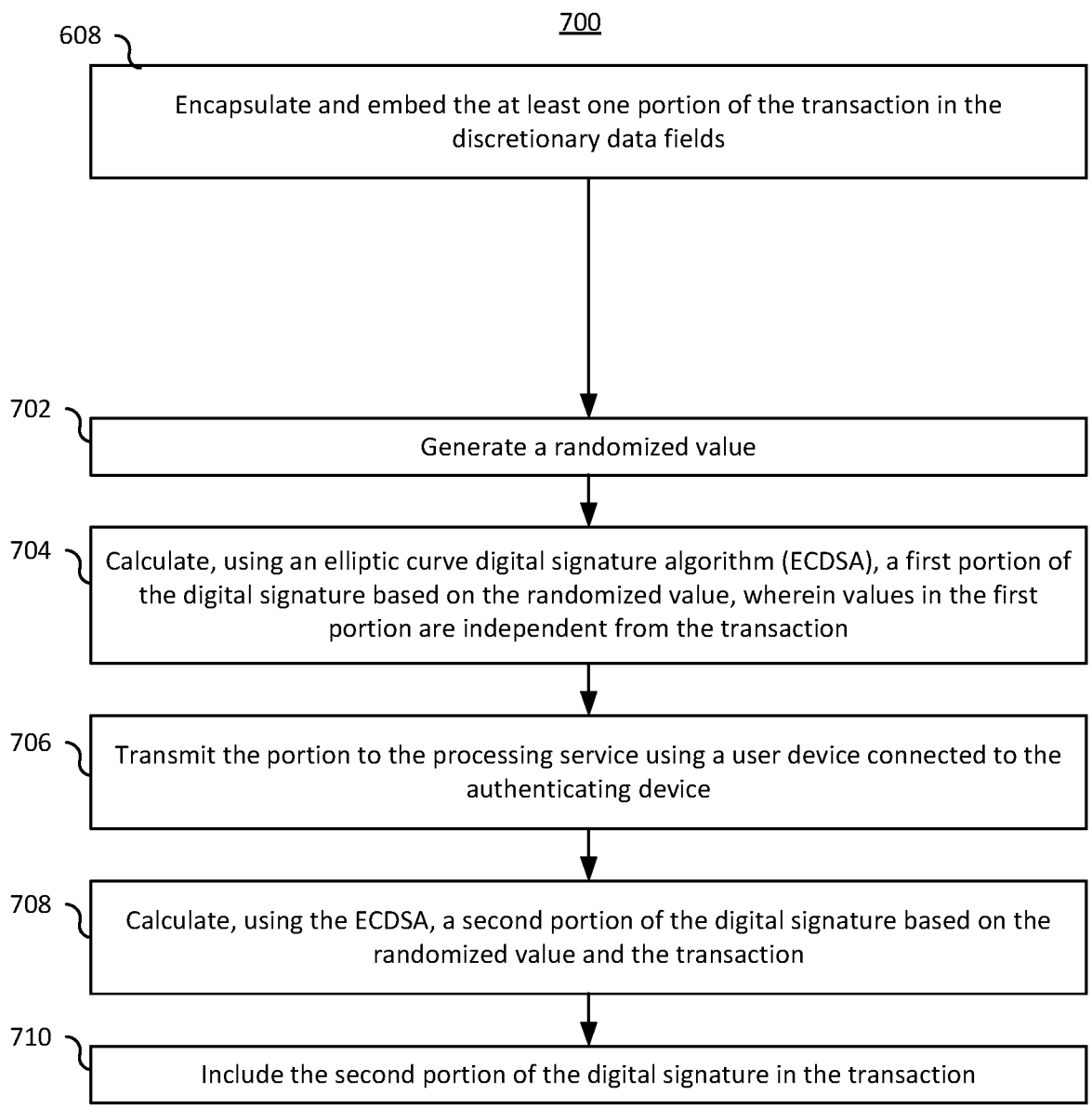
FIG. 7 illustrates a flow diagram of a method for encapsulating and embedding a portion of the transaction in the discretionary data fields.

FIG. 7 illustrates a flow diagram of method 700 for encapsulating and embedding a portion of the transaction in the discretionary data fields. Method 700 may be executed at 608 of method 600 and involves splitting the digital signature of the transaction. A specific example of method 700 is described in relation to diagram 400. At 702, applet 404 generates a randomized value (e.g., k). At 704, applet 404 calculates, using an elliptic curve digital signature algorithm (ECDSA), a first portion of the digital signature based on the randomized value (e.g., r), wherein values in the first portion are independent from the transaction. At 706, applet 404 transmits the portion to processing service 118 through user device 102 connected to authenticating device 104 (e.g., during the synchronization stage). At 708, applet 404 calculates, using the ECDSA, a second portion of the digital signature (e.g., s) based on the randomized value and the transaction. 708 is part of the transactional stage when authenticating device 104 connects with terminal device 110. At 710, applet 404 includes the second portion of the digital signature in the transaction (e.g., encapsulation in the EMV transaction, which is sent to processing service 118).

Figure 8:
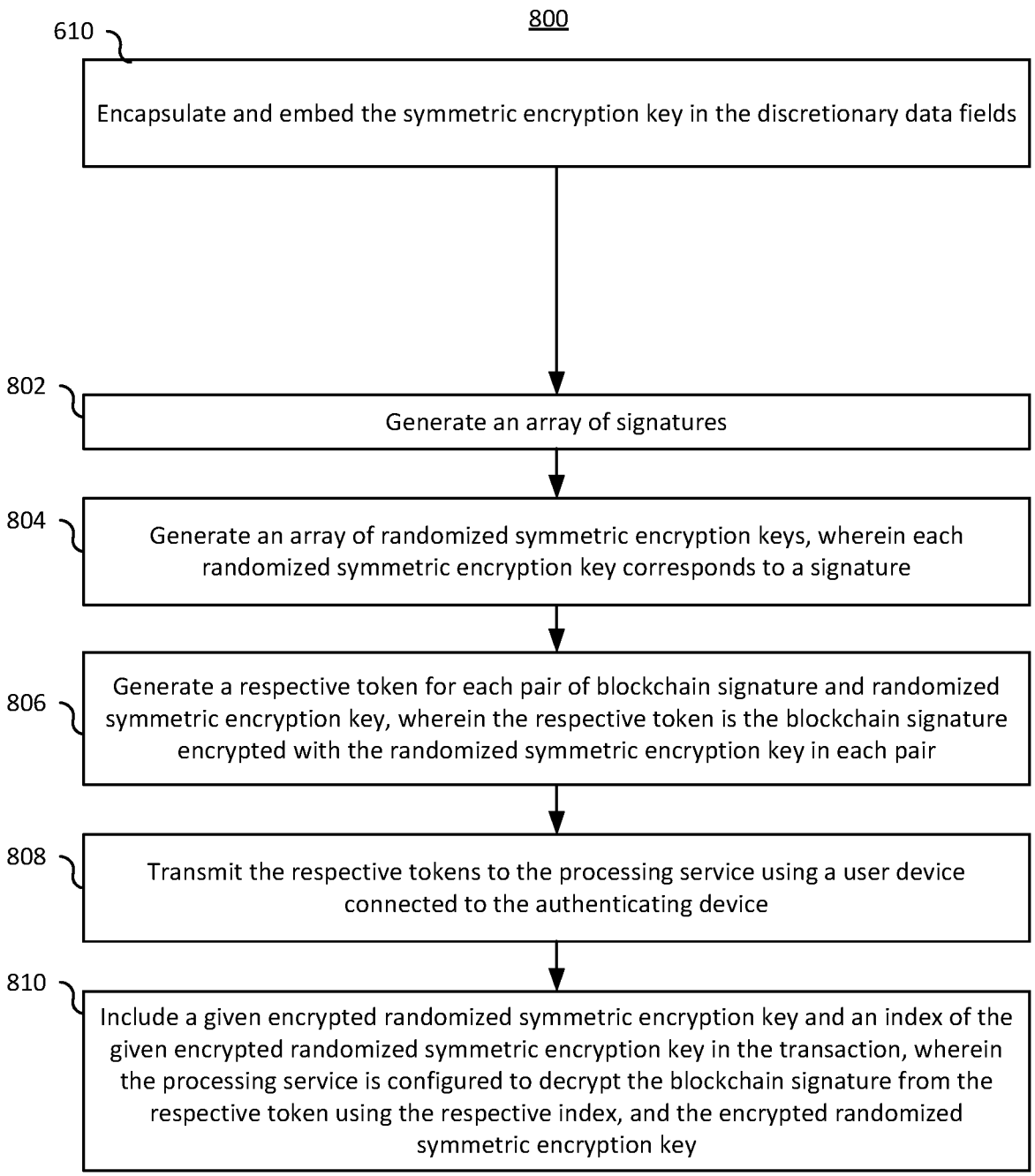
FIG. 8 illustrates a flow diagram of a method for encapsulating and embedding a symmetric encryption key in the discretionary data fields.

FIG. 8 illustrates a flow diagram of method 800 for encapsulating and embedding a symmetric encryption key in the discretionary data fields. Method 800 may be executed at 610 of method 600. A specific example of method 800 is described in relation to diagram 500. At 802, applet 404 generates an array of signatures (e.g., S). These signatures are, for example, $S=F(T_x)$, where Tx is a transaction from a plurality of pre-generated blockchain transactions each with a fixed transaction amounted (e.g., 10 USDC, 20 USDC, 0.5 ETH, 1 ETH, etc.) At 804, applet 404 generates an array of randomized symmetric encryption keys (e.g., K), wherein each randomized symmetric encryption key corresponds to a signature. At 806, applet 404 generates a respective token (e.g., T=AES128(K, S)) for each pair of blockchain signature and randomized symmetric encryption key, wherein the respective token is the blockchain signature encrypted with the randomized symmetric encryption key in each pair. At 808, applet 404 transmits the respective tokens to processing service 118 using user device 102 connected to authenticating device 104. 802-808 represent the synchronization stage of diagram 500. At 810 (e.g., the transactional stage), applet 404 includes a given encrypted randomized symmetric encryption key and an index of the given encrypted randomized symmetric encryption key in the transaction, wherein processing service 118 is configured to decrypt the blockchain signature from the respective token using the respective index, and the encrypted randomized symmetric encryption key.

Figure 9:
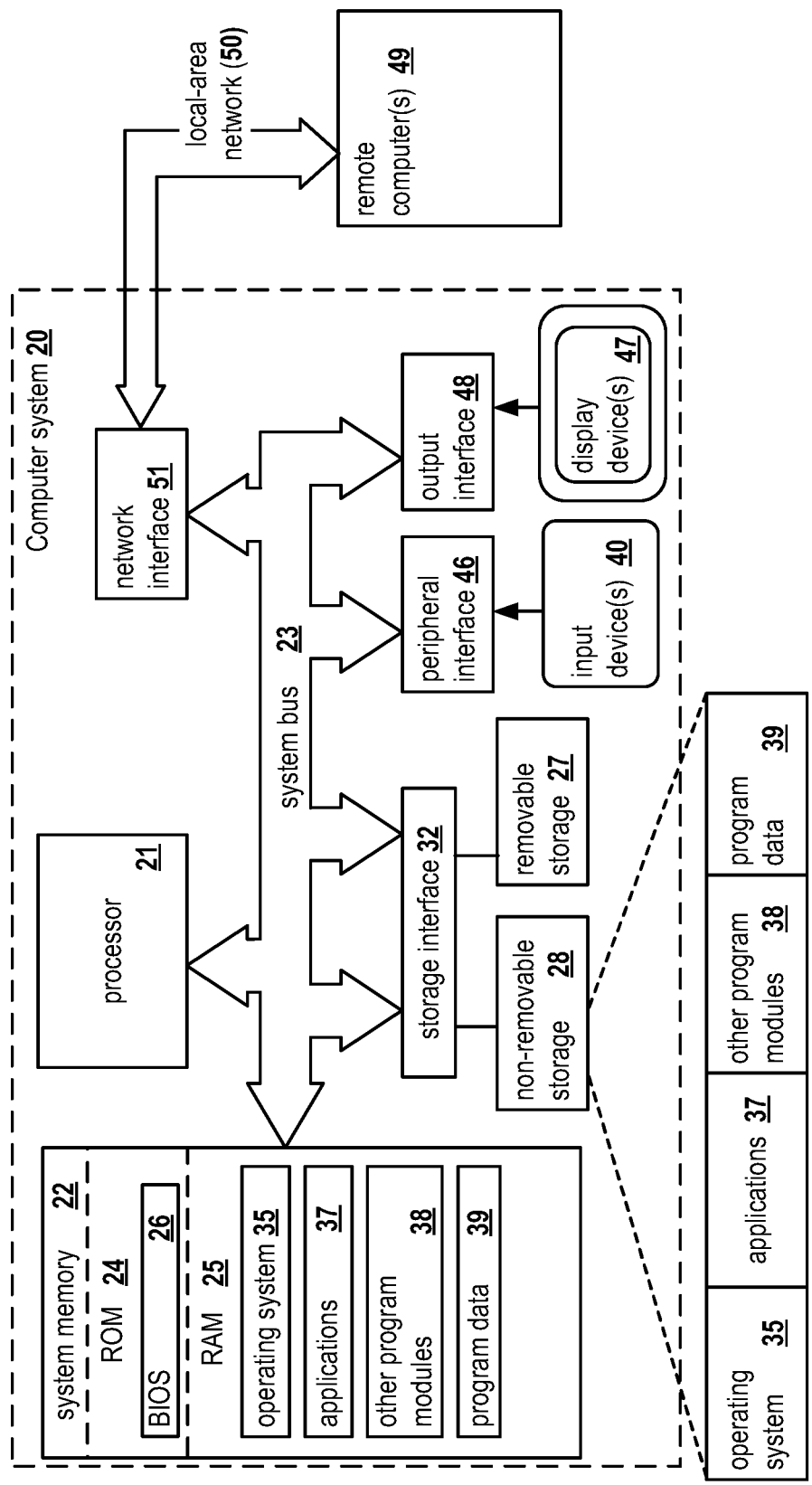
FIG. 9 presents an example of a general-purpose computer system on which aspects of the present disclosure can be implemented.

FIG. 9 is a block diagram illustrating a computer system 20 on which aspects of systems and methods for transaction authorization may be implemented in accordance with an exemplary aspect. Computer system 20 may represent any of the entities described in FIG. 1, may be a terminal device, a user device, or an authenticating device. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-8 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for transaction authorization, the method comprising:
    receiving, at an authenticating device from a terminal device, a request to generate a dataset transmittable through an underlying network compatible with a technical protocol, wherein the request comprises a plurality of data object values indicative of transaction information, and wherein credentials to authorize a transaction are stored on the authenticating device;
    generating, based on the plurality of data object values, a transaction comprising a source identifier, a destination identifier, a transaction value, and authorization data in a form of a digital signature;
    determining whether to encapsulate at least one portion of the transaction or a symmetric encryption key allowing to decrypt the digital signature based on a total amount of data that can be allocated and transmitted in discretionary data fields of the dataset of the technical protocol;
    encapsulating and embedding, based on the determination, either the at least one portion of the transaction or the symmetric encryption key in the discretionary data fields; and
    transmitting the dataset to the terminal device for processing the transaction in a target ledger.

2. The method of claim 1, wherein the authenticating device is one of:
    (1) a card comprising an embedded integrated circuit with memory and a microcontroller, and
    (2) a wearable device configured to communicate with the terminal device.

3. The method of claim 1, wherein determining whether to encapsulate the at least one portion of the transaction or the symmetric encryption key is further based on a size of the transaction and a length of the digital signature in the transaction.

4. The method of claim 1, wherein the transaction is a blockchain transaction indicative of transferring one or more blockchain assets equivalent to the transaction value from the authenticating device to an address comprised in the destination identifier.

5. The method of claim 1, wherein the transaction is a blockchain transaction and wherein the technical protocol is not compatible with the blockchain transaction.

6. The method of claim 1, wherein the transaction is forwarded to a processing service via a network operator associated with the authenticating device and an issuing entity that processes the transaction.

7. The method of claim 1, further comprising:
    in response to determining that the at least one portion of the transaction is to be encapsulated, splitting the digital signature of the transaction by:
    generating a randomized value;
    calculating, using an elliptic curve digital signature algorithm (ECDSA), a first portion of the digital signature based on the randomized value, wherein values in the first portion are independent from the transaction;
    transmitting the portion to a processing service using a user device connected to the authenticating device;
    calculating, using the ECDSA, a second portion of the digital signature based on the randomized value and the transaction; and
    including the second portion of the digital signature in the transaction.

8. The method of claim 1, further comprising:
    in response to determining that the symmetric encryption key is to be encapsulated, generating an array of signatures;
    generating an array of randomized symmetric encryption keys, wherein each randomized symmetric encryption key corresponds to a signature;
    generating a respective token for each pair of blockchain signature and randomized symmetric encryption key, wherein the respective token is the blockchain signature encrypted with the randomized symmetric encryption key in each pair;
    transmitting the respective tokens to a processing service using a user device connected to the authenticating device; and
    including a given encrypted randomized symmetric encryption key and an index of the given encrypted randomized symmetric encryption key in the transaction, wherein the processing service is configured to decrypt the blockchain signature from the respective token using the respective index, and the encrypted randomized symmetric encryption key.

9. The method of claim 1, wherein receiving, at the authenticating device, the request to generate the dataset is in response to the authenticating device coming in contact with the terminal device.

10. The method of claim 1, wherein receiving, at the authenticating device, the request to generate the dataset is in response to the authenticating device establishing a connection with the terminal device.

11. A system for transaction authorization, comprising:
    a hardware processor of an authenticating device, the hardware processor configured to:
    receive, at the authenticating device from a terminal device, a request to generate a dataset transmittable through an underlying network compatible with a technical protocol, wherein the request comprises a plurality of data object values indicative of transaction information, and wherein credentials to authorize a transaction are stored on the authenticating device;
    generate, based on the plurality of data object values, a transaction comprising a source identifier, a destination identifier, a transaction value, and authorization data in a form of a digital signature;
    determine whether to encapsulate at least one portion of the transaction or a symmetric encryption key allowing to decrypt the digital signature based on a total amount of data that can be allocated and transmitted in discretionary data fields of the dataset of the technical protocol;

encapsulate and embed, based on the determination, either the at least one portion of the transaction or the symmetric encryption key in the discretionary data fields; and transmit the dataset to the terminal device for processing the transaction in a target ledger.

12. The system of claim 11, wherein the authenticating device is one of:
(1) a card comprising an embedded integrated circuit with memory and a microcontroller, and
(2) a wearable device configured to communicate with the terminal device.

13. The system of claim 11, wherein the hardware processor is further configured to determine whether to encapsulate the at least one portion of the transaction or the symmetric encryption key based on a size of the transaction and a length of the digital signature in the transaction.

14. The system of claim 11, wherein the transaction is a blockchain transaction indicative of transferring one or more blockchain assets equivalent to the transaction value from the authenticating device to an address comprised in the destination identifier, and wherein the terminal device generates an alert indicating whether the transaction is authorized.

15. The system of claim 11, wherein the transaction is a blockchain transaction and wherein the technical protocol is not compatible with the blockchain transaction.

16. The system of claim 11, wherein the transaction is forwarded to a processing service via a network operator associated with the authenticating device and an issuing entity that processes the transaction.

17. The system of claim 11, wherein the hardware processor is further configured to:
in response to determining that the at least one portion of the transaction is to be encapsulated, split the digital signature of the transaction by:
generating a randomized value;
calculating, using an elliptic curve digital signature algorithm (ECDSA), a first portion of the digital signature based on the randomized value, wherein values in the first portion are independent from the transaction;
transmitting the portion to a processing service using a user device connected to the authenticating device;
calculating, using the ECDSA, a second portion of the digital signature based on the randomized value and the transaction; and
including the second portion of the digital signature in the transaction.

18. The system of claim 11, wherein the hardware processor is further configured to:

in response to determining that the symmetric encryption key is to be encapsulated, generate an array of signatures;

generate an array of randomized symmetric encryption keys, wherein each randomized symmetric encryption key corresponds to a signature;

generate a respective token for each pair of blockchain signature and randomized symmetric encryption key, wherein the respective token is the blockchain signature encrypted with the randomized symmetric encryption key in each pair;

transmit the respective tokens to a processing service using a user device connected to the authenticating device; and include a given encrypted randomized symmetric encryption key and an index of the given encrypted randomized symmetric encryption key in the transaction, wherein the processing service is configured to decrypt the blockchain signature from the respective token using the respective index, and the encrypted randomized symmetric encryption key.

19. The system of claim 11, wherein receiving, at the authenticating device, the request to generate the dataset is in response to the authenticating device coming in contact with the terminal device.

20. A non-transitory computer readable medium storing thereon computer executable instructions for transaction authorization, including instructions for:
receiving, at an authenticating device from a terminal device, a request to generate a dataset transmittable through an underlying network compatible with a technical protocol, wherein the request comprises a plurality of data object values indicative of transaction information, and wherein credentials to authorize a transaction are stored on the authenticating device;

generating, based on the plurality of data object values, a transaction comprising a source identifier, a destination identifier, a transaction value, and authorization data in a form of a digital signature;

determining whether to encapsulate at least one portion of the transaction or a symmetric encryption key allowing to decrypt the digital signature based on a total amount of data that can be allocated and transmitted in discretionary data fields of the dataset of the technical protocol;

encapsulating and embedding, based on the determination, either the at least one portion of the transaction or the symmetric encryption key in the discretionary data fields; and transmitting the dataset to the terminal device for processing the transaction in a target ledger.

* * * * *